Feb. 19, 1946.  F. E. BRADY, JR  2,395,095
FLUID SEAL
Filed Sept. 18, 1943
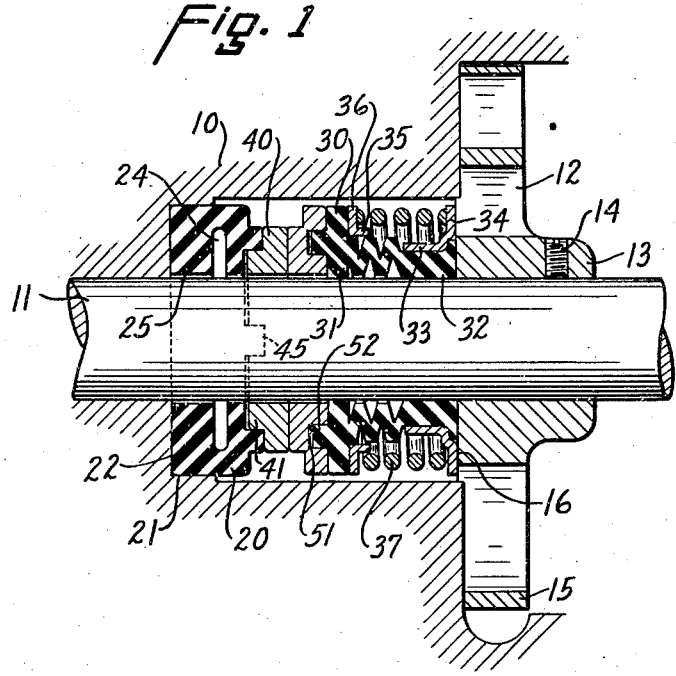
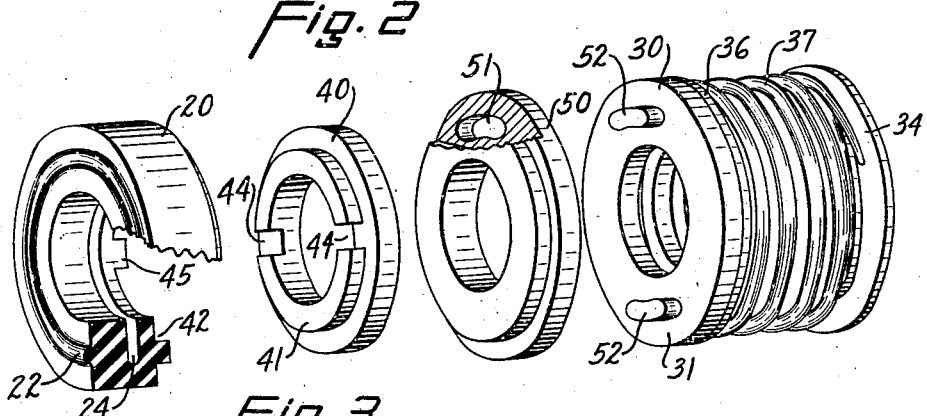
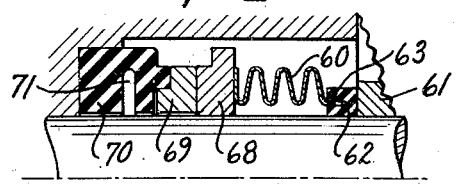
Inventor
Francis E. Brady Jr.
By
Marechal and Biebel
Attorneys Patented Feb. 19, 1946

2,395,095

UNITED STATES PATENT OFFICE 2,395,095

FLUID SEAL

Francis E. Brady, Jr., Muncie, Ind.

Application September 18, 1943, Serial No. 502,942

4 Claims. (Cl. 286—11)

This invention relates to fluid seals.

It is the principal object of the invention to provide a seal for sealing the rotary element of a pump or the like against the passage of liquid along the shaft and into the housing which is simple and inexpensive in construction, which has long life with substantial freedom from objectionable wear, and which maintains an effective sealed condition at all times.

It is also an object to provide such a seal which makes use of relatively stationary and rotating parts which are self-aligning so that without unnecessary frictional loss or wear they are at all times maintained in accurate running contact and closely sealed relation with each other.

It is a further object to provide such a seal in which the rotating element includes a flexible part which is maintained in direct sealing contact with the shaft to which it is applied to prevent leakage of fluid therealong.

Other objects and advantages will be apparent from the following description, the accompanying drawing, and the appended claims.

In the drawing—

Fig. 1 is a view in section through a representative shaft and housing showing the construction and relationship of the fluid seal of the present invention in its working relation thereto;

Fig. 2 is an exploded view in perspective of the seal with certain parts being broken away to more clearly indicate the construction of the several elements of the seal; and Fig. 3 is a broken sectional view of a modified construction.

Referring to the drawing which discloses a preferred embodiment of the invention, a housing such as a pump housing or the like is shown at 10, the shaft 11 extending therethrough and projecting beyond the end of the housing to provide for receiving the pump element such as shown at 12. Such pump may be of any desired construction, but is shown as comprising a hub 13 which may be secured in proper relation upon the shaft by means of set screw 14. The pump has impeller blades 15 which are shown as curved backwardly in the direction of rotation, having close working approach with the sides and outer periphery of the pump chamber. The inner face of the hub 13 is formed with an off-set portion 16 for engagement against the seal, as will be later described. A suitable type of construction for the pump impeller is that shown for example in applicant's prior Patent No. 2,164,869.

The seal comprises a yieldable or resilient stationary member 20 of generally cylindrical form which is adapted to be seated in a circular recess 21 formed in the housing, such member preferably being formed of rubber or like material. In order to effect a sealed relation with the housing, the stationary sealing member 20 is preferably formed with a semi-circular rib 22 on the end face thereof which is received within the recess. In operative condition as represented in Fig. 1, the rib has been substantially completely pressed into the body of the member with the result that a high pressure condition is established in the zone of the rib, affording an effective sealed condition. The member 20 is also preferably formed with a radially extending annular groove 24 which is open on its inner periphery, to thereby provide additional flexibility for the outer end of the member. It will be noted that the groove 24 extends outwardly over the major part of the radial thickness of the member 20 and preferably to a greater radial distance than the adjacent sealing face element, so that substantial flexibility and ease of self aligning adjustment can take place. Clearance as shown at 25 is provided around the shaft periphery.

Spaced from the stationary member 20 and adjacent the impeller 12 there is provided a sleeve member 30 which is formed of a corrugated or bellows-like construction, with end portions 31 and 32 which have close frictional engaging contact with the outer periphery of the shaft, the sleeve rotating with the shaft. End portion 32 is formed with a lesser outside diameter than that of end portion 31, and receives a ring 33 having an integral radially extending flange 34, this flange being in engaging relation with the off-set portion 16 of the impeller hub. A similar ring 35 and radially extending flange 36 is received against the opposite end 31 of the sleeve, and between the two flanges there extends a spiral compression spring 37, tending to extend the sleeve axially of the shaft.

It will thus be clear that when the impeller is mounted in operative position on the shaft, an axial pressure is developed by the off-set portion 16 against the sleeve end 32 and likewise against the flange 34, thereby transmitting an axial thrust through the spring to flange 36 and the remote end 31 of the sleeve. Likewise such application of pressure causes the squeezing or deformation of the end 32 of the sleeve into close sealing contact with the shaft so that passage of liquid is effectively prevented.

Interposed between the stationary member 20 and the rotating sleeve 30 there is positioned a construction which forms a sealed running connection which is substantially freely self-aligning so that under the pressure transmitted through spring 37, the desired sealed relationship is maintained while avoiding excessive friction and wear, the self-alignment of the parts assuring that throughout the running engagement thereof they will maintain the desired close sealing relationship.

As shown, such interposed elements comprise a stationary face plate 40 having an off-set annular rib 41 formed thereon and projecting toward a corresponding groove 42 in stationary member 20 so that when assembled in face to face relation therewith, there will be an overlapping of these surfaces to afford an effective sealed connection therebetween. The rib 41 is provided with interfitting parts to prevent rotation of the plate while providing for free self-aligning adjustment thereof. This comprises a plurality of notches 44 formed in the rib 41 which interfit with projections or lugs 45 extending forwardly from stationary member 20.

Cooperating with the stationary face plate 40 is a rotary face plate 50 which has a plurality of recesses 51 therein in position to be engaged by lugs 52 carried on the end part 31 of the sleeve 30. With the lugs 52 in engagement with apertures 51, it will be clear that the plate 50 is caused to rotate with the sleeve, while at the same time being held and supported for substantial freedom of adjusting movement so as to maintain freedom of self-alignment. Both face plates have clearance around the shaft to provide for freedom of movement with respect thereto, the end 31 of sleeve 30 preferably having a slip fit upon the shaft.

Preferably one or the other of the face plates is made of a material which will afford good wear qualities, will be self-lubricating of low friction and will maintain a sealed relationship under a limited degree of pressure. It is preferred for this purpose to construct the plate 50 of a material such as carbon or Bakelite and to make the plate 40 of metallic material such as bronze, Mehanite or Nitroloy. Either or both of these plates are capable of ready replacement when rendered necessary on account of wear.

Fig. 3 shows a modified construction in which a metal sleeve or bellows 60 is utilized having sufficient inherent resiliency to provide for developing an axial thrust. At the end adjacent the hub 61 of the impeller a flexible boot of rubber material 62 is received over the flanged end 63 of the bellows. In order to develop a firm sealed relation with the shaft, the internal diameter of the rubber ring 62 is made slightly less than the external diameter of the shaft so that when pressed over the shaft the rubber will be compressed between the shaft and flange 63, deforming the rubber, and sealing it tightly to the shaft against the hub 61.

At the opposite end of the sleeve there is positioned a rotating face plate 68, connection being made to the upturned end of the bellows as by welding. The rotating plate 68 has clearance around the shaft as shown and is free to shift its position as required to maintain proper alignment. The stationary face plate 69 and stationary resilient member 70 seated within the housing may be constructed substantially as above described, and are provided with interlocking parts as shown to hold the stationary plate 69 against turning. Because of the grooved construction 71 of the member 70, this plate also is relatively freely supported for proper sealing relation with the rotating plate.

It will thus be seen that with the constructions as above described the stationary elements and the sleeves are effectively sealed with respect to the housing and the shaft, respectively, while the face plates themselves, each of which has sealed relation with respect to its associated element, have such freedom of alignment that in response to the limited axial thrust condition established, they will properly align themselves in such close fitting running engagement that a proper and effective sealed condition is maintained therebetween at all times. The pressure necessary to maintain such alignment is small and thus the parts may be made light in weight and will have long life. When repair or replacement is required, that is facilitated by the freedom with which the device may be assembled and disassembled.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Means for sealing a shaft with respect to a housing to prevent the passage of liquid comprising a flexible stationary member having frictional seating engagement within a recess within said housing, said member being directly removable from said recess and having clearance around said shaft, said stationary member having an inner annular groove providing increased flexibility and adjusting movement for the end thereof, a flexible sleeve member having close fitting frictional engagement with said shaft and adapted to be compressed in operative position to transmit a thrust axially of said sleeve and to press said sleeve into close sealing contact with said shaft, a stationary face plate having clearance with respect to said shaft, means cooperating between said stationary member and said face plate for preventing rotation of the latter while supporting the same for self-aligning movement, a rotating face plate having sealed running engagement with said stationary face plate, and means for supporting said rotating face plate from said sleeve while providing for substantially free self-aligning movement thereof.

2. Means for sealing a shaft with respect to a housing comprising a yieldable stationary member adapted to be seated within a recess in the housing in sealed relation thereto and having clearance with respect to said shaft, a stationary face plate also having clearance with respect to said shaft, means on said stationary member for retaining said face plate against rotation while providing for free self-aligning movement thereof in sealed relation thereto, said stationary member and said face plate having overlapping surfaces maintaining an effective seal at the junction around the periphery thereof, an expansible sleeve having its inner part in sealed relation with respect to said shaft and in close frictional engagement therewith, and a rotating face plate having sealed running engagement with said stationary face plate, means carried by said sleeve for driving said rotating face plate therewith while providing for free self-aligning movement thereof against said stationary face plate, and yieldable means engaging said expansible sleeve and operable through said drive means for applying pressure to maintain said face plates in running sealed relation with each other.

3. Means for sealing a shaft with respect to a housing comprising a yieldable stationary member adapted to be seated within a recess in the housing and to establish a sealed relation upon contact therewith, a stationary face plate, means on said stationary member for retaining said face plate against rotation while providing for free self-aligning movement thereof, an expansible sleeve, flexible means on said sleeve remote from said stationary member for frictionally engaging said shaft in sealed relation therewith, a rotating face plate having sealed running engagement with said stationary face plate and having clearance around said shaft, means carried by said sleeve for driving said rotating face plate therewith while providing for free self-aligning movement thereof against said stationary face plate, said sleeve being sealed with respect to said rotating face plate and having inherent resiliency and being subjected to compression to maintain a running pressure engagement between said face plates.

4. Means for sealing a shaft with respect to a housing comprising a yieldable stationary member adapted to be seated within a recess in the housing in sealed relation thereto and having clearance with respect to said shaft, said member being flexible and recessed to permit of longitudinal compression, a stationary face plate also having clearance with respect to said shaft mounted in fluid sealing relation with said stationary member, means on said stationary member for retaining said face plate against rotation while providing for free self-aligning movement thereof in said sealed relation thereto, a rotating flexible sleeve elongated to provide a collapsible portion to permit of axial expansion and compression thereof, said portion of the sleeve being spaced from said shaft and provided at one end thereof remote from said stationary member with a portion having close frictional and sealing contact with said shaft, a rotating face plate having sealing running engagement with said stationary face plate operatively connected and supported upon the opposite end of said sleeve for rotation and axial movement therewith, and a compression spring surrounding the collapsible portion of said sleeve interposed between the opposite end portions thereof for retaining said plates in sealing relation under spring tension.

FRANCIS E. BRADY, Jr.